United States Patent
Kamiya

(10) Patent No.: US 7,588,116 B2
(45) Date of Patent: Sep. 15, 2009

(54) OPENING/CLOSING CONTROLLING APPARATUS

(75) Inventor: Masachika Kamiya, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 335 days.

(21) Appl. No.: 10/591,713

(22) PCT Filed: Feb. 18, 2005

(86) PCT No.: PCT/JP2005/003093

§ 371 (c)(1),
(2), (4) Date: Sep. 6, 2006

(87) PCT Pub. No.: WO2005/087548

PCT Pub. Date: Sep. 22, 2005

(65) Prior Publication Data

US 2007/0199760 A1    Aug. 30, 2007

(30) Foreign Application Priority Data

Mar. 11, 2004    (JP) ............................ 2004-069531

(51) Int. Cl.
*B60R 21/0136* (2006.01)
*B60R 21/013* (2006.01)

(52) U.S. Cl. ........................ 180/274; 180/271; 180/281; 180/282; 180/286; 49/31; 701/45

(58) Field of Classification Search ................. 180/271, 180/274, 281, 282, 286; 49/31; 701/45
See application file for complete search history.

(56) References Cited

U.S. PATENT DOCUMENTS

| 4,217,582 | A | * | 8/1980 | Endo et al. .................... 342/70 |
|---|---|---|---|---|
| 4,458,446 | A | * | 7/1984 | Mochida et al. ................. 49/28 |
| 4,667,195 | A | * | 5/1987 | Kodera et al. ............... 340/901 |
| 5,327,990 | A | * | 7/1994 | Busquets .................... 180/271 |
| 5,469,138 | A | * | 11/1995 | Tsai ........................... 340/500 |
| 5,574,315 | A | * | 11/1996 | Weber ....................... 307/10.1 |

(Continued)

FOREIGN PATENT DOCUMENTS

CN    2863564 Y    1/2007

(Continued)

OTHER PUBLICATIONS

Toyota Crown New Model Manual GRS 18# series Dec. 2003, p. 3-204.

*Primary Examiner*—Paul N. Dickson
*Assistant Examiner*—Barry Gooden, Jr.
(74) *Attorney, Agent, or Firm*—Finnegan, Henderson, Farabow, Garrett & Dunner, LLP

(57) ABSTRACT

An opening/closing controlling apparatus of the present invention has an automatic opening/closing mechanism for automatically opening and closing an opening/closing object such as a door; a collision detecting sensor for detecting a collision of a vehicle; a time measuring device for measuring a time from a time when the collision detecting sensor detects a collision of the vehicle; and an opening/closing controller for prohibiting automatic opening/closing of the opening/closing object from the time of the collision of the vehicle and for permitting the automatic opening/closing by the automatic opening/closing mechanism after passage of a predetermined time since the collision. The present invention successfully achieves high reliability in the event of a vehicle accident.

11 Claims, 9 Drawing Sheets

U.S. PATENT DOCUMENTS

| | | | |
|---|---|---|---|
| 5,894,906 A * | 4/1999 | Weber | 180/274 |
| 6,170,864 B1 * | 1/2001 | Fujita et al. | 280/735 |
| 6,895,312 B2 * | 5/2005 | Iida | 701/1 |
| 6,998,969 B2 * | 2/2006 | Aiyama et al. | 340/426.28 |
| 7,102,539 B2 * | 9/2006 | Kawazoe et al. | 340/940 |
| 7,109,850 B2 * | 9/2006 | Kawazoe et al. | 340/425.5 |
| 7,311,169 B1 * | 12/2007 | Caliskan et al. | 180/274 |
| 2001/0007963 A1 * | 7/2001 | Ugusa et al. | 701/49 |
| 2002/0177931 A1 | 11/2002 | Iwasaki et al. | |
| 2003/0184098 A1 | 10/2003 | Aiyama et al. | |
| 2004/0059488 A1 * | 3/2004 | Iida | 701/49 |
| 2004/0124027 A1 * | 7/2004 | Aiyama et al. | 180/274 |
| 2005/0274561 A1 * | 12/2005 | Claar et al. | 180/281 |
| 2006/0033612 A1 * | 2/2006 | Santa | 340/435 |
| 2007/0085669 A1 * | 4/2007 | Becker et al. | 340/457.1 |

FOREIGN PATENT DOCUMENTS

| | | |
|---|---|---|
| EP | 1 338 731 | 8/2003 |
| JP | 5-78619 | 10/1993 |
| JP | 9-273342 | 10/1997 |
| JP | 11-170867 | 6/1999 |
| JP | 2003-269028 | 9/2003 |

* cited by examiner

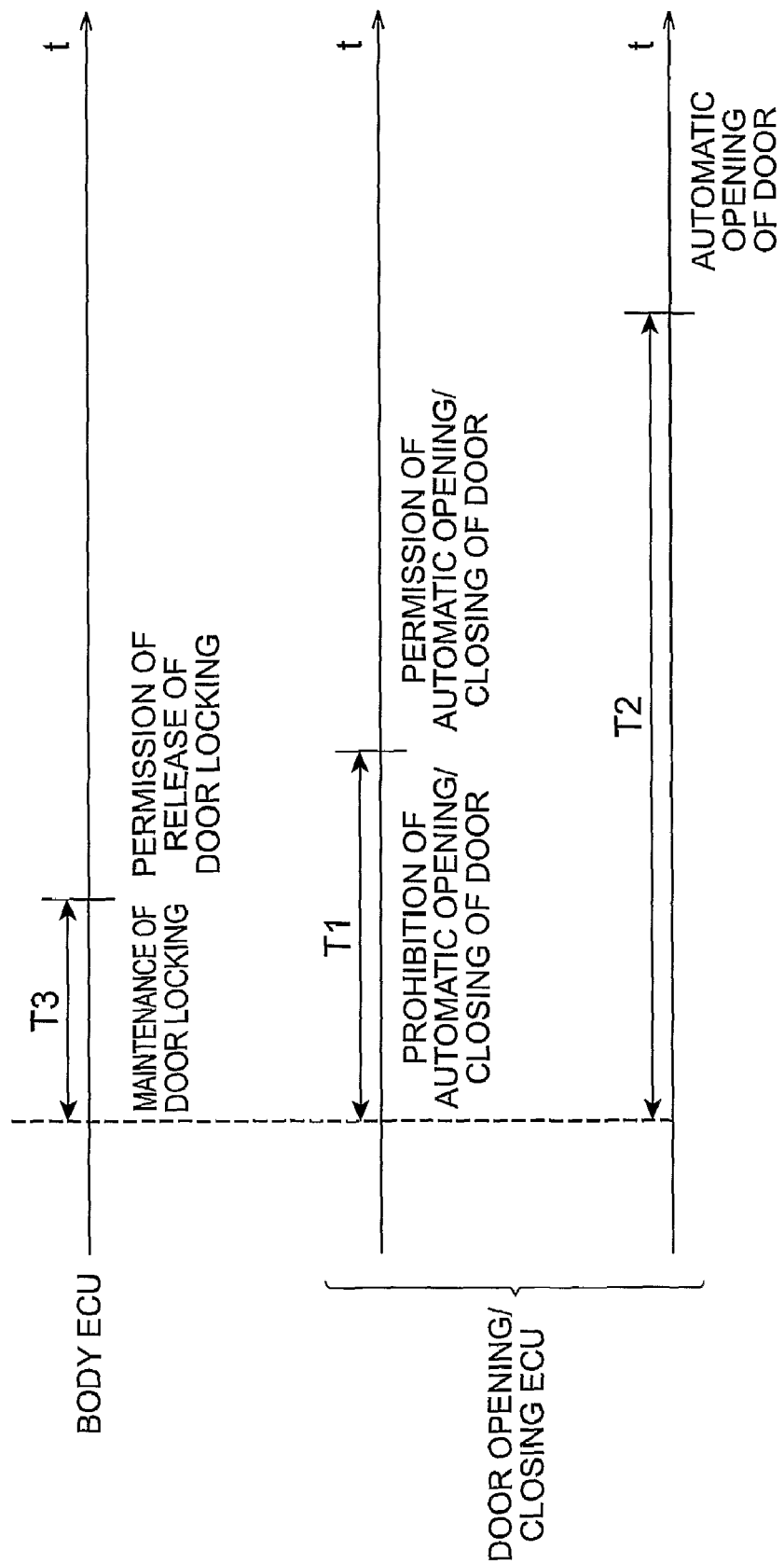

OPENING/CLOSING CONTROLLING APPARATUS

TECHNICAL FIELD

The present invention relates to an opening/closing controlling apparatus for controlling opening and closing of an opening/closing object such as a door mounted on a vehicle.

BACKGROUND ART

An example of the conventionally known opening/closing controlling apparatus for controlling opening and closing of an opening/closing object such as a door mounted on a vehicle is the one described in Japanese Utility Model Application Laid-Open No. 5-78619. The apparatus described in the official gazette of the above application is constructed in a configuration wherein with reception of an airbag actuation signal from an airbag controller an ON delay circuit measures a predetermined time from the time of reception of the actuation signal and wherein after passage of the predetermined time a door lock actuator is actuated to the unlock side. This apparatus is designed not to unlock the door at the same time as occurrence of a collision accident, whereby a vehicle occupant is prevented from being thrown out of the vehicle.

DISCLOSURE OF THE INVENTION

If the occupant is injured in the event of the collision accident of the vehicle, the occupant should be promptly transported to medial facilities, and then the injured must be carried into an ambulance as soon as the ambulance arrives at an accident location. On that occasion, as well as merely unlocking the door of the accident vehicle, it is desirable that the injury condition of the occupant should be soon checked and quicker rescue should be performed.

In order to actuate the apparatus after the collision of the vehicle, it is necessary to prevent a defect such as a failure in actuation of the apparatus due to crash impact. For this reason, it is desirable to enhance actuation reliability of ensuring secure actuation even in the event of collision of the vehicle. An object of the present invention is therefore to provide an opening/closing controlling apparatus with high actuation reliability in the event of a vehicle accident.

An opening/closing controlling apparatus of the present invention is an apparatus for performing an automatic opening/closing control of an opening/closing object mounted on a vehicle, which comprises automatic opening/closing means for automatically opening/closing the opening/closing object; collision detecting means for detecting a collision of the vehicle; time measuring means for measuring a time from a time when the collision detecting means detects the collision of the vehicle; and opening/closing controlling means for prohibiting automatic opening/closing of the opening/closing object from the time of the collision of the vehicle and for permitting the automatic opening/closing by the automatic opening/closing means after passage of a predetermined time since the collision. The opening/closing object stated herein is an object that separates the compartment from the exterior space and that can be opened and closed. The present invention successfully provides the opening/closing controlling apparatus with high actuation reliability in the event of a vehicle accident.

Preferably, the time measuring means for measuring the predetermined time comprises at least two time measuring circuits. In this configuration, the automatic opening/closing operation of the opening/closing object is prohibited from the time of the collision of the vehicle to passage of the predetermined time, whereby it is feasible to prevent the opening/closing object from being unexpectedly opened in the event of collision and thereby to enhance the occupant safety. In this connection, since at least two time measuring circuits for measuring the predetermined time are provided to implement at least double time measuring systems, even if the collision of the vehicle causes a malfunction of one time measuring circuit, the other time measuring circuit can perform accurate time measurement, thus enhancing the actuation reliability of the apparatus.

In a further preferred configuration herein, the time measuring means comprises first time measuring means and second time measuring means each for measuring a first time from the time when the collision detecting means detects the collision of the vehicle; the opening/closing controlling means prohibits the automatic opening/closing operation of the opening/closing object from the time when the collision detecting means detects the collision of the vehicle and thereafter the opening/closing controlling means permits the automatic opening/closing operation of the opening/closing object after passage of the first time is measured by both the first time measuring means and the second time measuring means.

In another preferred configuration herein, the time measuring means comprises first time measuring means for measuring a first time from the time when the collision detecting means detects the collision of the vehicle, and second time measuring means for measuring a second time from the time when the collision detecting means detects the collision of the vehicle, the second time measuring means being provided separately from the first time measuring means; the opening/closing controlling means prohibits the automatic opening/closing operation of the opening/closing object from the time when the collision detecting means detects the collision of the vehicle, thereafter the opening/closing controlling means permits the automatic opening/closing operation of the opening/closing object after passage of the first time, and then the opening/closing controlling means makes the automatic opening/closing means perform an opening operation of the opening/closing object after passage of the second time set longer than the first time.

In this invention, the automatic opening/closing operation of the opening/closing object is prohibited from the time of the collision of the vehicle to passage of the first time, whereby it is feasible to prevent the opening/closing object from being unexpectedly opened in the event of collision and thereby to enhance the occupant safety. Since the opening/closing object is opened after passage of the second time from the time of the collision of the vehicle, emergency staff can perform quick occupant rescue if an occupant is injured. On that occasion, the opening/closing object is automatically opened, and then the injured occupant can readily escape out of the vehicle without effort of opening the opening/closing object. Furthermore, since the first time measuring means and the second time measuring means are separately provided, even if one of the first time measuring means and the second time measuring means breaks down because of the collision of the vehicle, the other can perform the time measurement, so as to enhance the actuation reliability of the apparatus.

In a further preferred configuration herein, the apparatus further comprises locking maintaining means for maintaining a locking state of the opening/closing object from the time when the collision detecting means detects the collision of the vehicle, to passage of a third time set shorter than the first time.

In this configuration, the locking of the opening/closing object is maintained from the time of the collision of the vehicle to passage of the third time, whereby it is feasible to prevent the locking of the opening/closing object from being released because of the collision and thereby to prevent the opening/closing object from being unexpectedly opened. Therefore, it is feasible to enhance the occupant safety.

BRIEF DESCRIPTION OF THE DRAWINGS

FIG. 9 is a timing chart showing the operation of the opening/closing controlling apparatus of the third embodiment.

BEST MODE FOR CARRYING OUT THE INVENTION

Embodiments of the present invention will be described below in detail with reference to the accompanying drawings. The same elements will be denoted by the same reference symbols throughout the description of the drawings, without redundant description.

First Embodiment

Figure 1:
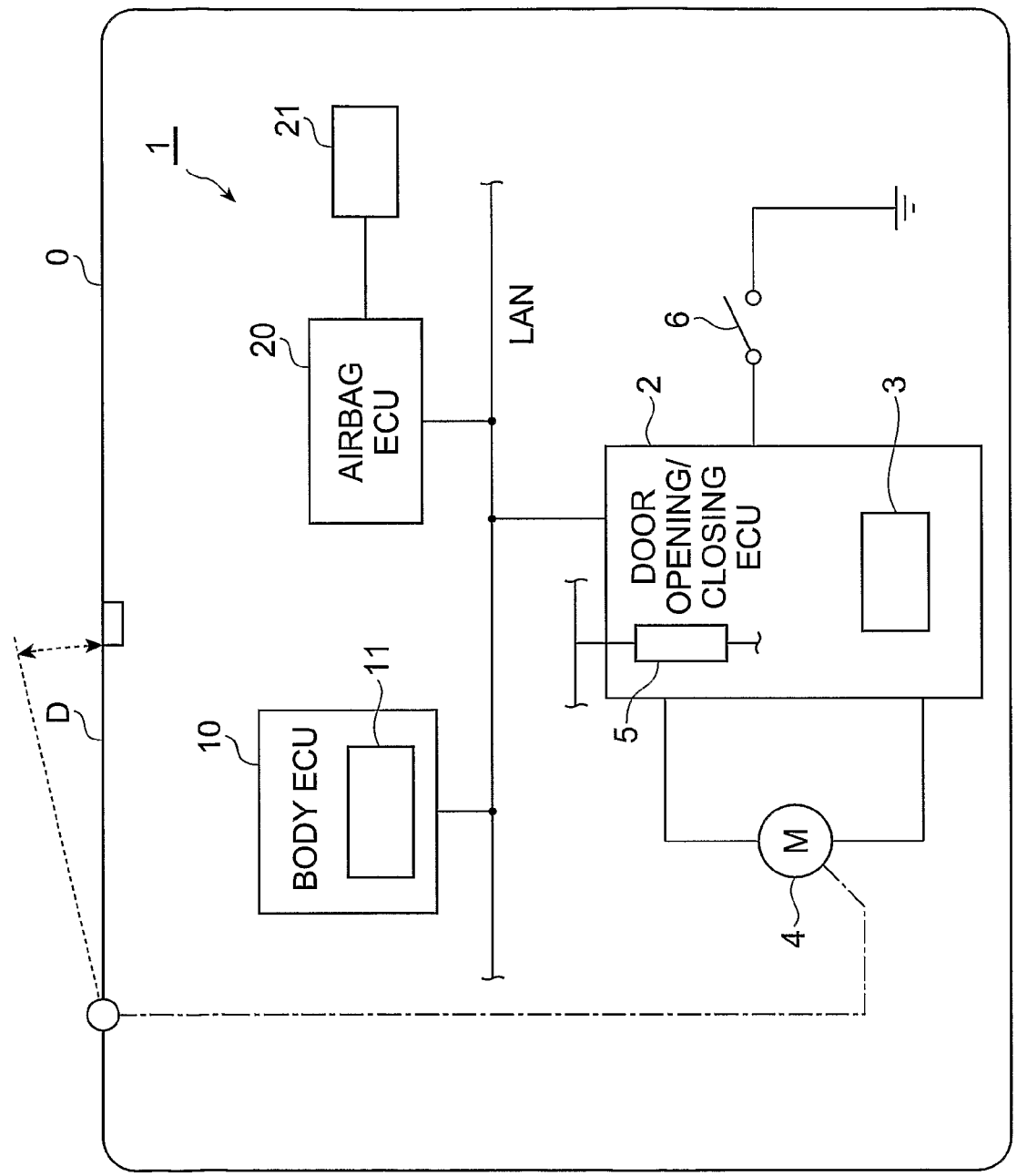
FIG. 1 is a schematic diagram of a configuration of an opening/closing controlling apparatus according to the first embodiment of the present invention.

FIG. 1 is a schematic diagram of a configuration of an opening/closing controlling apparatus according to the first embodiment of the present invention. As shown in FIG. 1, the opening/closing controlling apparatus 1 is an apparatus for performing automatic opening/closing of a door (opening/closing object) D of a vehicle 0 and is mounted on the vehicle 0 provided with the door D. This opening/closing controlling apparatus 1 is equipped with a door opening/closing ECU (Electronic Control Unit) 2. The door opening/closing ECU 2 is an opening/closing controlling means for performing an automatic opening/closing control of the door D, and is comprised, for example, of a CPU, a ROM, a RAM, an input signal circuit, an output signal circuit, a power supply circuit, and so on. The door opening/closing ECU 2 is provided with a timer circuit 3. The timer circuit 3 functions as a second time measuring means for measuring a predetermined second time T2 from a time of detection of a collision of the vehicle.

An actuator 4 is connected to the door opening/closing ECU 2. The actuator 4 is an automatic opening/closing means for automatically opening and closing the door D of the vehicle, and the operation thereof is controlled by the door opening/closing ECU 2. For example, a motor is used as this actuator 4, and the actuator 4 operates with an actuation signal from the door opening/closing ECU 2 to automatically open or close the door D through a door opening/closing mechanism.

The door opening/closing ECU 2 is provided with a power supply cut relay 5. The power supply cut relay 5 is mounted on a wiring line for supply of power to the actuator 4 and is configured to supply power to the actuator 4 by an on operation and to stop the supply of power to the actuator 4 by an off operation. During this off operation, the power supply is stopped to deactivate the actuator 4 to prohibit the automatic opening/closing of the door D. During this period, the power supply cut relay 5 functions as opening/closing prohibiting means of the door D. This opening/closing prohibiting means for prohibiting the automatic opening/closing may be any other means than the power supply cut relay 5 as long as it can prohibit the automatic opening/closing.

An actuation switch 6 is also connected to the door opening/closing ECU 2. The actuation switch 6 is a switch for opening/closing of the door D, and is switched on by an occupant of the vehicle 0 whereupon the door opening/closing ECU 2 activates the actuator 4 to automatically open the door D. On the other hand, when the occupant turns off the switch 6, the door opening/closing ECU 2 activates the actuator 4 to automatically close the door D.

The door opening/closing ECU 2 is connected to a body ECU 10 and to an airbag ECU 20. Each of the ECUs 2, 10, and 20 is arranged to be able to transmit and receive signals to and from each other, for example, by LAN (or CAN) communication. Each of the ECUs 2, 10, and 20 is able to receive each of an engine start signal, a vehicle speed signal, etc. through the LAN communication.

The body ECU 10 is a controlling means for controlling operations of parts mounted on the body of the vehicle, and is comprised, for example, of a CPU, a ROM, a RAM, an input signal circuit, an output signal circuit, a power supply circuit, and so on. This body ECU 10 is provided with a timer circuit 11. The timer circuit 11 functions as a first time measuring means for measuring a predetermined fist time T1 from a time when a collision of the vehicle is detected.

The airbag ECU 20 is a controlling means for controlling the operation of the airbag, and is comprised, for example, of a CPU, a ROM, a RAM, an input signal circuit, an output signal circuit, a power supply circuit, and so on. A collision sensor 21 is connected to this airbag ECU 20. The collision sensor 21 is a collision detecting means for detecting a collision of the vehicle 0. In the event of a collision of the vehicle, the airbag ECU 20 detects an output signal from the collision sensor 21 to activate the airbag. On that occasion, the airbag ECU 20 outputs a collision signal to each of the door opening/closing ECU 2 and the body ECU 10.

This output of the collision signal may be done through the LAN communication, but it is preferable to perform it through a dedicated line provided separately from the LAN communication. In this case, the collision signal can be securely outputted through the dedicated line to the door opening/closing ECU 2 and to the body ECU 10 even with a trouble in the LAN communication due to the collision.

Figure 2:
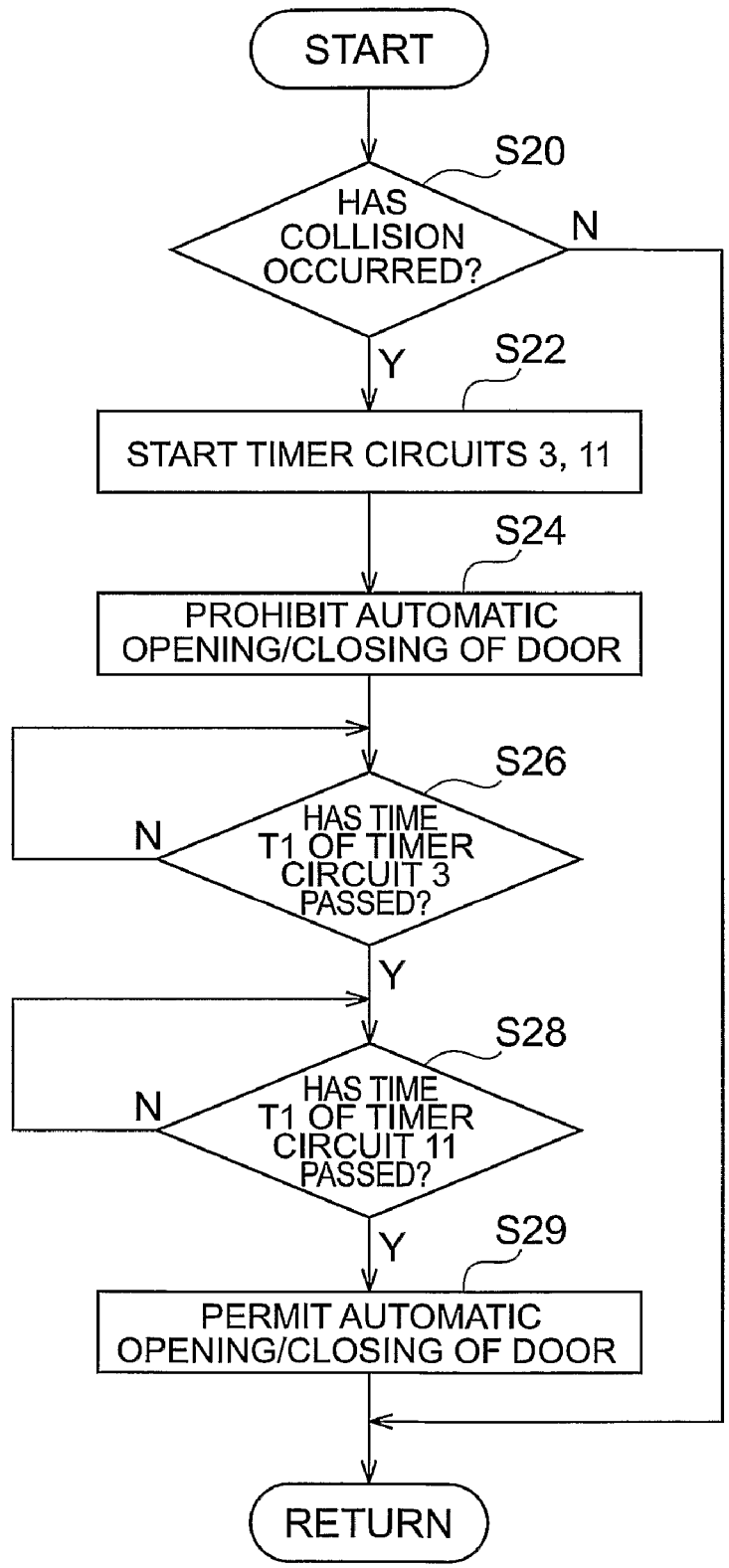
FIG. 2 is a flowchart showing the operation of the opening/closing controlling apparatus according to the first embodiment.

The operation of the opening/closing controlling apparatus according to the present embodiment will be described below. The opening/closing controlling apparatus of the present embodiment is provided with double time measuring systems to measure the first time T1 by the two timer circuits 3, 11. FIG. 2 shows a flowchart of the operation of the opening/closing controlling apparatus according to the present embodiment. The control processing in FIG. 2 is executed, for example, by the door opening/closing ECU 2.

First, as shown at S20 in FIG. 2, it is determined whether a collision of the vehicle 0 has occurred. This determination is made according to presence/absence of input of the collision signal from the airbag ECU 20 to the door opening/closing ECU 2. When it is determined that no collision of the vehicle 0 has occurred, the control processing is terminated. When it is determined on the other hand that a collision of the vehicle 0 has occurred, the timer circuits 3, 11 start to measure the first time T1 (S22).

In each of the timer circuits 3, 11, the first time T1 is set as a time to be measured. The time to be measured by the timer circuit 3 is set in the door opening/closing ECU 2, and the time to be measured by the timer circuit 11 is set in the body ECU 10. This first time T1 is set, for example, to a time falling within the range of 3 to 20 seconds. The time measurement of the timer circuit 3 is initiated by the door opening/closing ECU 2. On the other hand, the time measurement of the timer circuit 11 is carried out in such a manner that the door opening/closing ECU 2 outputs a time measurement start signal to the body ECU 10 and the body ECU 10 receives it to initiate the time measurement. Alternatively, the time measurement of the timer circuit 3 may be initiated at a time when the door opening/closing ECU 2 receives a collision signal from the airbag ECU 20, and the time measurement of the timer circuit 11 may be initiated at a time when the body ECU 10 receives a collision signal from the airbag ECU 20.

Then the flow moves to S24 to perform an automatic opening/closing prohibiting process of the door D. The automatic opening/closing prohibiting process is a process of prohibiting the automatic opening/closing of the door D. For example, the automatic opening/closing prohibiting process is carried out in such a manner that the door opening/closing ECU 2 turns off the power supply cut relay 5 to prohibit the operation of the actuator 4.

Then it is determined whether the first time T1 of the timer circuit 3 has passed (S26). When it is determined that the first time T1 in the timer circuit 3 has not passed, this process is repeated. When it is determined on the other hand that the first time T1 in the timer circuit 3 has passed, it is determined whether the first time T1 in the timer circuit 11 has passed (S28).

When it is determined that the first time T1 in the timer circuit 11 has not passed, this process is repeated. When it is determined on the other hand that the first time T1 in the timer circuit 11 has passed, an automatic opening/closing permitting process of the door D is carried out (S29). The automatic opening/closing permitting process is a process of permitting the automatic opening/closing of the door D. For example, the automatic opening/closing permitting process is carried out in such a manner that the door opening/closing ECU 2 turns on the power supply cut relay 5 to enable the operation of the actuator 4. This enables the automatic opening/closing of the door D according to manipulation on the actuation switch 6.

As described above, the opening/closing controlling apparatus of the present embodiment is arranged to prohibit the automatic opening/closing operation of the door D from the time of the collision of the vehicle 0 to passage of the first time T1, whereby it is feasible to prevent the door D from being unexpectedly opened in the event of collision and thereby to enhance the occupant safety.

In this connection, the first time T1 is measured by the two timer circuit 3 and timer circuit 11; therefore, even if one timer circuit malfunctions due to the collision of the vehicle 0 the other time measuring circuit can perform accurate time measurement, thereby enhancing the actuation reliability of the apparatus. For example, even in a case where the timer circuit 3 breaks down because of the collision of the vehicle 0 and outputs a first time passage signal before passage of the first time T1, unless the first time T1 has passed in the other timer circuit 11, the automatic opening/closing of the door D is not permitted before passage of the first time T1. For this reason, the automatic opening/closing can be prohibited before passage of the first time T1, thus enhancing the actuation reliability of the apparatus.

The present embodiment described the example where the first time T1 was measured by the two timer circuits 3, 11, but the opening/closing controlling apparatus according to the present invention does not have to be limited to this configuration; for example, the apparatus may be arranged to perform the opening/closing control of the door D with use of three or more timer circuits.

Second Embodiment

An opening/closing controlling apparatus according to the second embodiment will be described below. The opening/closing controlling apparatus of the present embodiment has a hardware configuration similar to that of the opening/closing controlling apparatus 1 of the first embodiment shown in FIG. 1. The opening/closing controlling apparatus of the present embodiment is arranged to prohibit the automatic opening/closing operation of the door D from a time of detection of a collision of the vehicle 0, thereafter to permit the automatic opening/closing operation of the door D after passage of a first time T1, and then to perform an opening operation of the door D after further passage of a second time T2 (>the first time T1).

Figure 3:
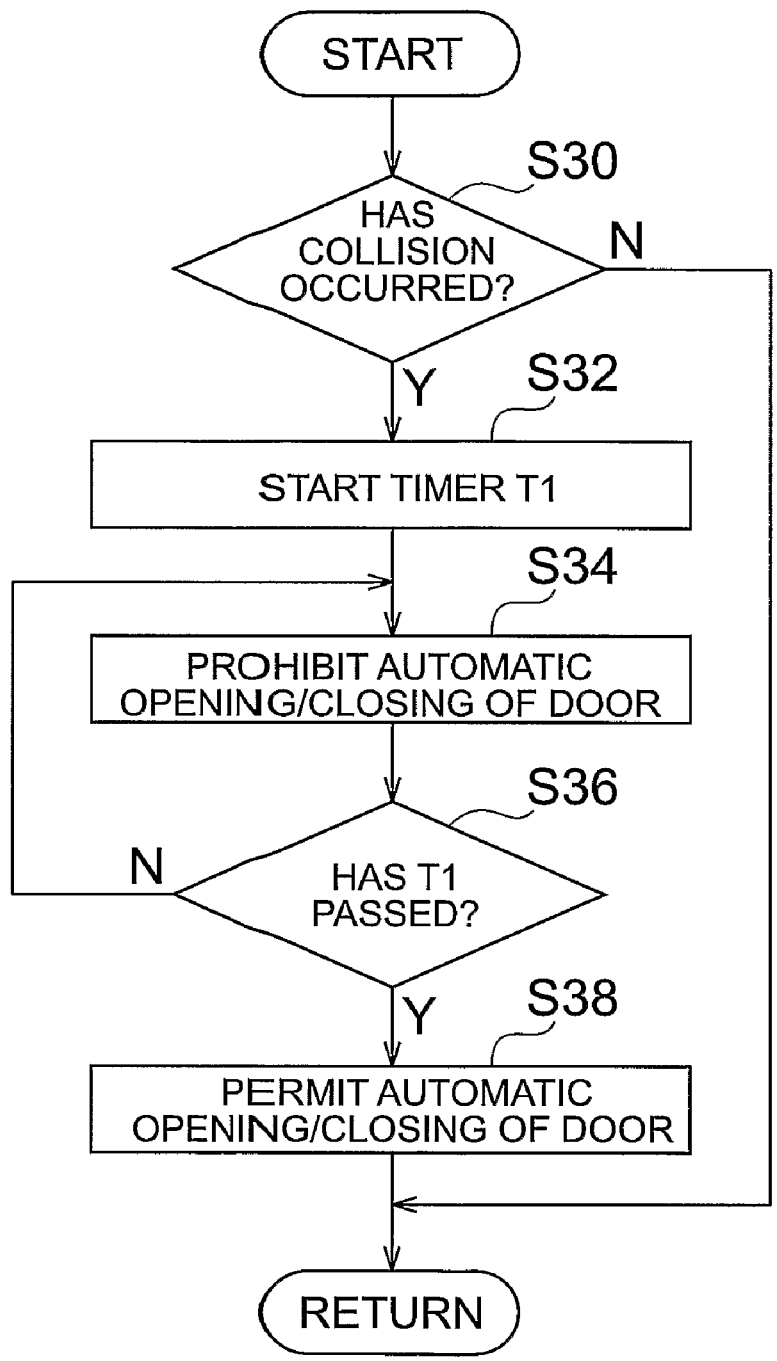
FIG. 3 is a flowchart showing the operation of the opening/closing controlling apparatus of the first embodiment.
Figure 4:
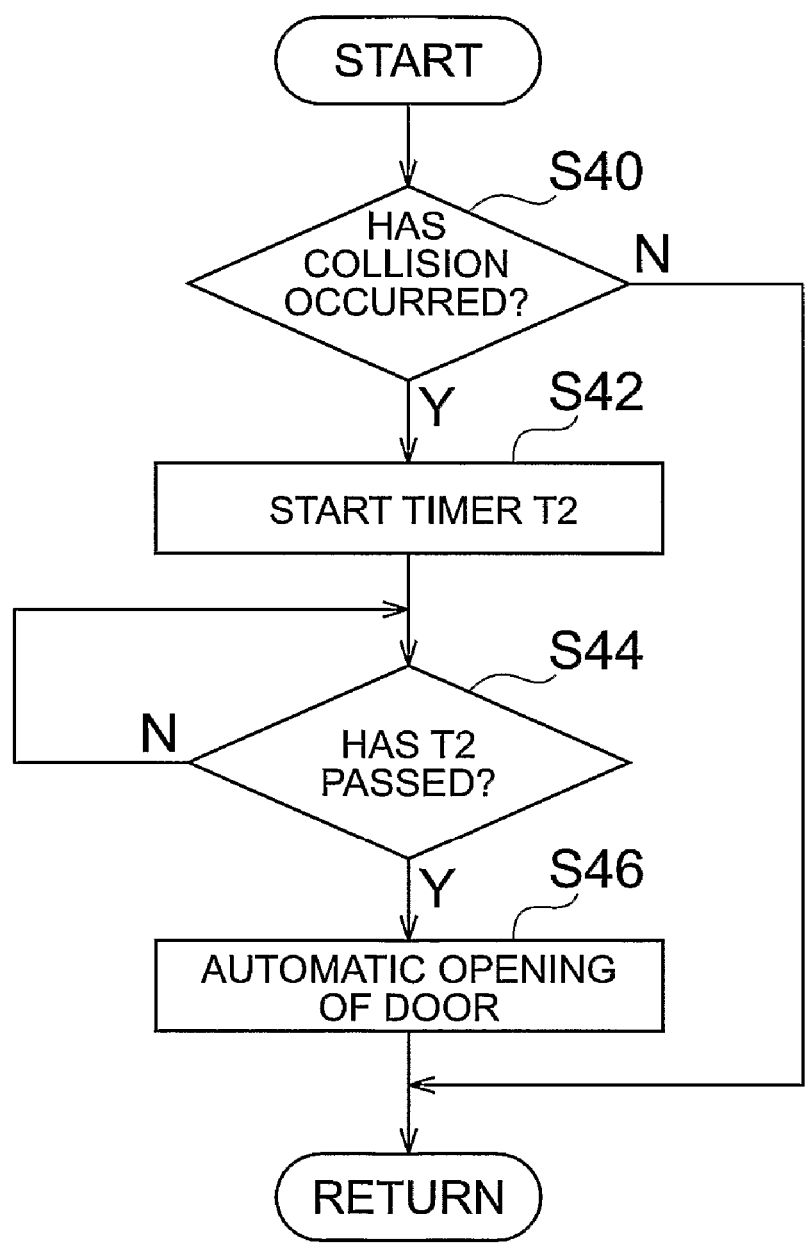
FIG. 4 is a flowchart showing the operation of the opening/closing controlling apparatus of the second embodiment.
Figure 5:
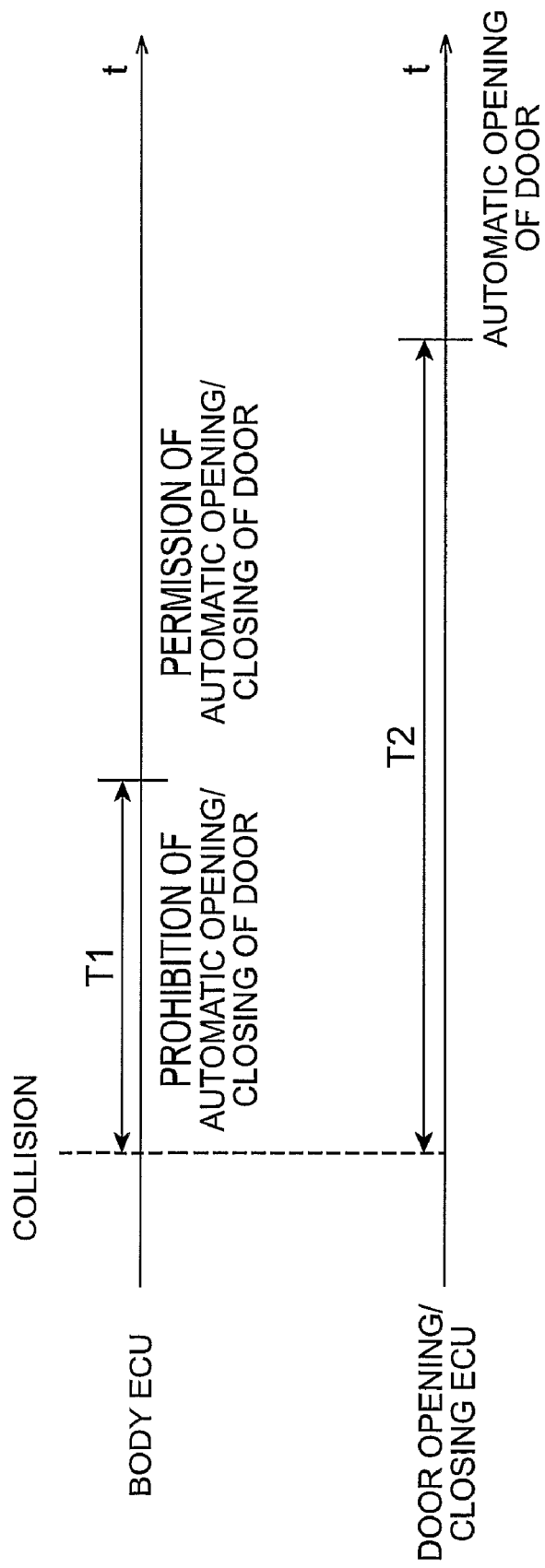
FIG. 5 is a timing chart showing the operation of the opening/closing controlling apparatus of the second embodiment.

FIGS. 3 and 4 show flowcharts of the operation of the opening/closing controlling apparatus according to the present embodiment. FIG. 5 is a timing chart showing the operation of the opening/closing controlling apparatus of the present embodiment. The control processing in FIG. 3 is executed, for example, by the body ECU 10, and the control processing in FIG. 4, for example, by the door opening/closing ECU 2.

First, as shown at S30 in FIG. 3, the body ECU 10 determines whether a collision of the vehicle 0 has occurred. This determination is made according to presence/absence of input of a collision signal from the airbag ECU 20 to the body ECU 10. When it is determined that no collision of the vehicle 0 has occurred, the control processing is terminated. When it is determined on the other hand that a collision of the vehicle 0 has occurred, the timer circuit 11 starts to measure the first time T1 (S32). The first time T1 is a time preliminarily set in the body ECU 10, and is set, for example, to a time falling within the range of 3 to 20 seconds.

Then the flow moves to S34 to perform an automatic opening/closing prohibiting process of the door D. The automatic opening/closing prohibiting process is a process of prohibiting the automatic opening/closing of the door D. For example, the automatic opening/closing prohibiting process is carried out in such a manner that the body ECU 10 outputs an opening/closing prohibition signal to the door opening/closing ECU 2 and the door opening/closing ECU 2, receiving the opening/closing prohibition signal, turns off the power supply cut relay 5 to prohibit the operation of the actuator 4.

It is then determined whether the first time T1 has passed (S36). When it is determined that the first time T1 has not passed, the flow returns to S34 to continue the automatic opening/closing prohibition of the door D. When it is determined on the other hand that the first time T1 has passed, an automatic opening/closing permitting process of the door D is carried out (S38). The automatic opening/closing permitting process is a process of permitting the automatic opening/closing of the door D. For example, the automatic opening/closing permitting process is carried out in such a manner that the body ECU 10 outputs an opening/closing permission signal to the door opening/closing ECU 2 and the door opening/closing ECU 2, receiving the opening/closing permission signal, turns on the power supply cut relay 5 to enable the operation of the actuator 4. This enables the automatic opening/closing of the door D according to manipulation on the actuation switch 6.

On the other hand, as shown at S40 in FIG. 4, the door opening/closing ECU 2 determines whether a collision of the vehicle 0 has occurred. This determination is made according to presence/absence of input of a collision signal from the airbag ECU 20 to the door opening/closing ECU 2. When it is determined that no collision of the vehicle 0 has occurred, the control processing is terminated. When it is determined on the other hand that a collision of the vehicle 0 has occurred, the timer circuit 3 starts to measure the second time T2 (S42). The second time T2 is a time preliminarily set in the door opening/closing ECU 2 and is set longer than the first time T1. This second time T2 is set, for example, to a time falling within the range of 30 seconds to 3 minutes.

Then the flow moves to S44 to determine whether the second time T2 has passed. When it is determined that the second time T2 has passed, an automatic opening process of the door D is carried out (S46). The automatic opening process is a process of automatically opening the door D. For example, the actuator 4 is actuated by control of the door opening/closing ECU 2 to force the door D to open. Then the control processing is terminated.

As described above, the opening/closing controlling apparatus 1 of the present embodiment is arranged to prohibit the automatic opening/closing of the door D from the time of the collision of the vehicle 0 to passage of the first time T1, as shown in FIG. 5, whereby it is feasible to prevent the door D from being unexpectedly opened because of the collision. For this reason, it is feasible to enhance the occupant safety in the event of vehicle collision. In addition, the apparatus is arranged to automatically open the door D after passage of the second time T2 (>the first time T1) since the time of the collision of the vehicle, whereby, in case of an occupant being injured, emergency staff can perform quick occupant rescue. Since the door D is automatically opened, the injured occupant can readily escape out of the car without effort of opening the door D.

Since the apparatus is provided with the separate timers of the timer circuit 11 for measuring the first time T1 and the timer circuit 3 for measuring the second time T2, even if one of the timer circuits 3,11 breaks down because of the collision of the vehicle, the other can perform the time measurement, so as to enhance the actuation reliability. For example, in a case where the timer circuit 11 breaks down because of the collision of the vehicle 0 and outputs a first time passage signal before passage of the first time T1, if the timer circuit 3 is normal, the door D is not automatically opened before the second time T2 is measured in the timer circuit 3.

The present embodiment described the example where the automatic opening/closing prohibiting process was carried out in the body ECU 10, but this automatic opening/closing prohibiting process may also be carried out in the door opening/closing ECU 2. In this case, the body ECU 10 outputs an elapsed time signal of the timer circuit 11 to the door opening/closing ECU 2 and the door opening/closing ECU 2 can execute the automatic opening/closing prohibiting process with reception of the signal.

Third Embodiment

An opening/closing controlling apparatus of the third embodiment will be described below. The opening/closing controlling apparatus of the present embodiment has much the same configuration as the opening/closing controlling apparatus of the first embodiment described above, and is arranged to perform the automatic opening/closing prohibiting process and the opening process of the door D in the event of collision of the vehicle 0. However, the opening/closing controlling apparatus of the present embodiment is different from the opening/closing controlling apparatus of the first embodiment in that in the event of a collision of the vehicle 0 the door is locked upon the collision and the locking of the door is maintained from the time of the collision to passage of a predetermined time.

Figure 6:
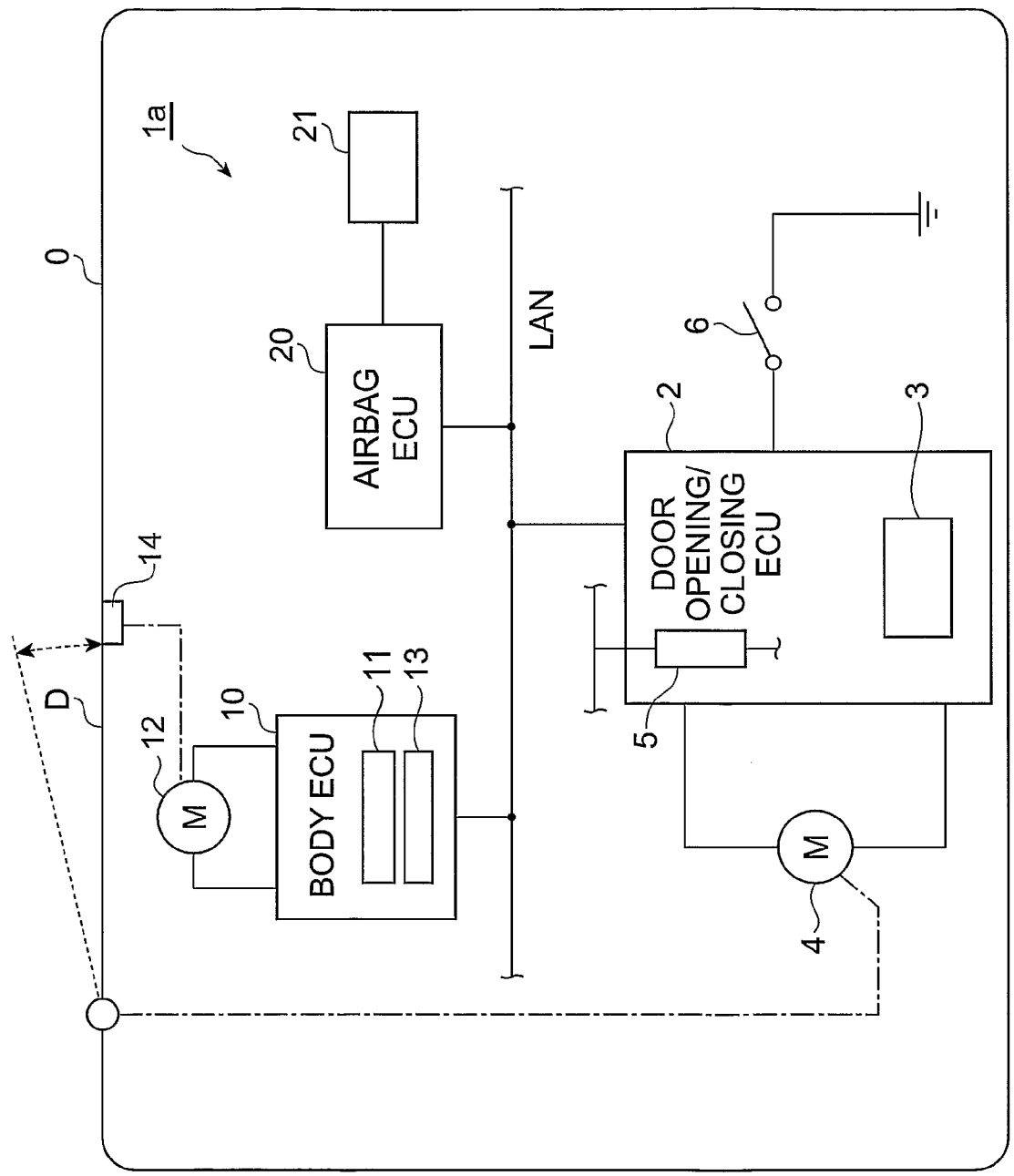
FIG. 6 is a schematic diagram of a configuration of an opening/closing controlling apparatus according to the third embodiment of the present invention.

FIG. 6 shows a schematic diagram of a configuration of the opening/closing controlling apparatus according to the third embodiment. As shown in FIG. 6, the opening/closing controlling apparatus 1a is constructed in much the same configuration as the opening/closing controlling apparatus 1 of FIG. 1, but is different from it in having a door lock actuator 12 and a timer circuit 13. The door lock actuator 12 is an actuator for locking or unlocking the door D which can be automatically opened and closed. The door lock actuator 12 is connected to the body ECU 10 and is actuated with reception of an actuation signal from the body ECU 10 to lock or unlock (release locking of) the door D through a door lock mechanism 14.

The timer circuit 13 is provided in the body ECU 13 and functions as a third time measuring means for measuring a predetermined third time T3 from a time of detection of a collision of the vehicle 0. The third time T3 is set to a time shorter than the first time T1.

Figure 7:
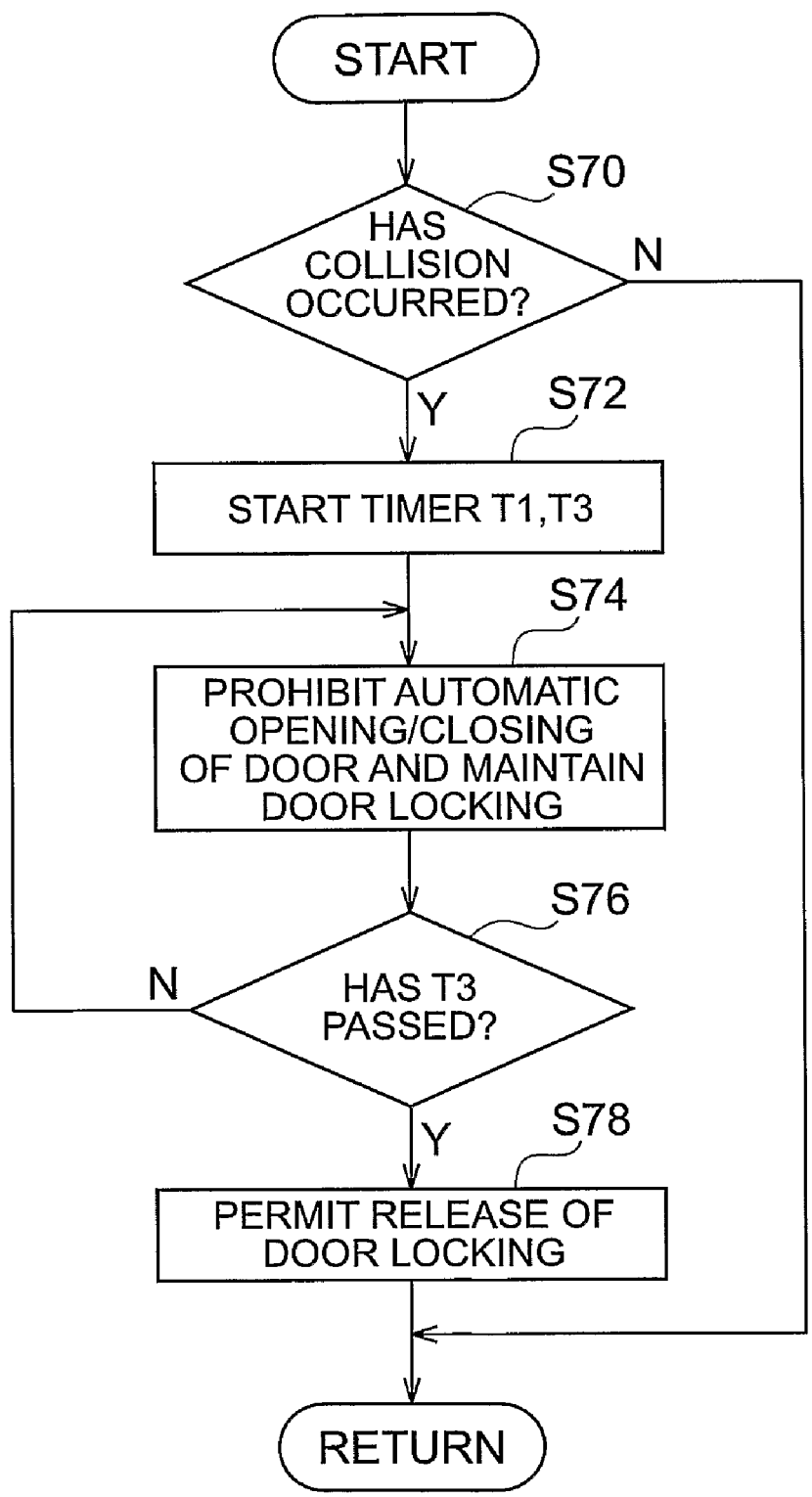
FIG. 7 is a flowchart showing the operation of the opening/closing controlling apparatus of the third embodiment.
Figure 8:
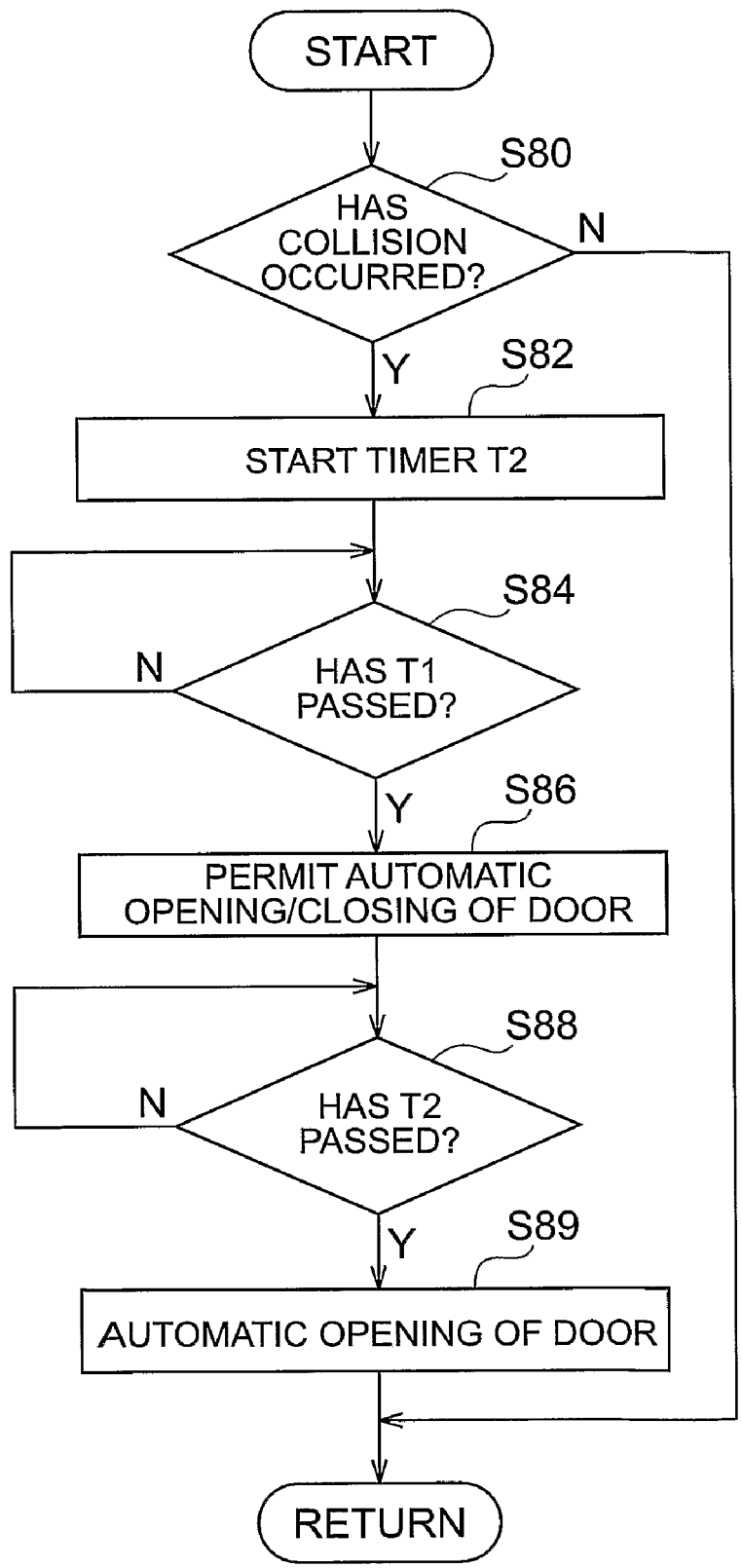
FIG. 8 is a flowchart showing the operation of the opening/closing controlling apparatus of the third embodiment.

The operation of the opening/closing controlling apparatus according to the present embodiment will be described below. FIGS. 7, 8 show flowcharts of the operation of the opening/closing controlling apparatus according to the present embodiment. FIG. 9 is a timing chart about the operation of the opening/closing controlling apparatus of the present embodiment. The control processing in FIG. 7 is executed, for example, by the body ECU 10, and the control processing in FIG. 8, for example, by the door opening/closing ECU 2.

First, as shown at S70 in FIG. 7, the body ECU 10 determines whether a collision of the vehicle 0 has occurred. This determination is made according to presence/absence of input of a collision signal from the airbag ECU 20 to the body ECU 10. When it is determined that no collision of the vehicle 0 has occurred, the control processing is terminated.

When it is determined at S70 on the other hand that a collision of the vehicle 0 has occurred, the timer circuit 11 starts to measure the first time T1 and the timer circuit 13 starts to measure the third time T3 (S72). The first time T1 is a time preliminarily set in the body ECU 10 and is set, for example, to a time falling within the range of 3 to 20 seconds. The third time T3 is a time preliminarily set in the body ECU 10 and is set to a time shorter than the first time T1.

Then the flow goes to S74 to perform an automatic opening/closing prohibiting process and a door locking maintaining process of the door D. The automatic opening/closing prohibiting process is a process of prohibiting the automatic opening/closing of the door D. For example, the automatic opening/closing prohibiting process is carried out in such a manner that the body ECU 10 outputs an opening/closing prohibition signal to the door opening/closing ECU 2 and the door opening/closing ECU 2, receiving the opening/closing prohibition signal, turns off the power supply cut relay 5 to prohibit the operation of actuator 4.

The door locking maintaining process is a process of maintaining the locking state of the door D. For example, the body ECU 10 prohibits the operation of the actuator 12 to maintain locking of the door D. This keeps the door D from being unlocked even if an unlock switch of the door D is turned on.

It is then determined whether the third time T3 has passed (S76). When it is determined that the third time T3 has not passed, the flow returns to S74 to maintain the automatic opening/closing prohibition and door locking of the door. When it is determined on the other hand that the third time T3 has passed, a door unlock permitting process is carried out (S78). The door unlock permitting process is a process of enabling release of the door locking according to manipulation on the unlock switch. This enables unlocking, for example, by an unlocking operation by an occupant of the vehicle 0 or the like.

On the other hand, as shown at S80 in FIG. 8, the door opening/closing ECU 2 determines whether a collision of the vehicle 0 has occurred. This determination is made according to presence/absence of input of a collision signal from the airbag ECU 20 to the door opening/closing ECU 2. When it is determined that no collision of the vehicle 0 has occurred, the control processing is terminated. When it is determined on the other hand that a collision of the vehicle 0 has occurred, the timer circuit 3 starts to measure the second time T2 (S82). The second time T2 is a time preliminarily set in the door opening/closing ECU 2 and is set longer than the first time T1. This second time T2 is set, for example, to a time falling within the range of 30 seconds to 3 minutes.

Then the flow goes to S84 to determine whether the first time T1 has passed. Whether the first time T1 has passed can be determined, for example, by appropriately supplying an elapsed time signal of the timer circuit 11 from the body ECU 10 to the door opening/closing ECU 2 and letting the door opening/closing ECU 2 make the determination based on the elapsed time signal. Alternatively, the door opening/closing ECU 2 may determine whether the first time T1 has passed, based on whether a first time passage signal is received from the body ECU 10.

When it is determined at S84 that the first time T1 has passed, an automatic opening/closing permitting process is carried out (S86). The automatic opening/closing permitting process is a process of permitting the automatic opening/closing of the door D. For example, the automatic opening/closing permitting process is carried out in such a manner that the door opening/closing ECU 2 turns on the power supply cut relay 5 to enable the operation of the actuator 4. This enables the automatic opening/closing of the door D according to manipulation on the actuation switch 6.

Then the flow goes to S88 to determine whether the second time T2 has passed. When it is determined that the second time T2 has passed, an automatic opening process of the door D is carried out (S89). The automatic opening process is a process of automatically opening the door D. For example, the actuator 4 is actuated by control of the door opening/closing ECU 2 to force the door D to open. Then the control processing is terminated.

As described above, the opening/closing controlling apparatus 1*a* of the present embodiment is arranged to maintain the locking of the door D from the time of the collision of the vehicle 0 to passage of the third time T3, as shown in FIG. 9, whereby it is feasible to prevent the locking of the door from being released upon the collision and to prevent the door D from being unexpectedly opened. For this reason, it is feasible to enhance the occupant safety in the event of vehicle collision.

As in the second embodiment, the automatic opening/closing operation of the door D is prohibited from the time of the collision of the vehicle 0 to passage of the first time T1, whereby it is feasible to prevent the door D from being unexpectedly opened because of the collision. For this reason, it is feasible to enhance the occupant safety in the event of vehicle collision. Since the door D is automatically opened after passage of the second time T2 (>first time T1) since the time of the collision of the vehicle 0, emergency staff can perform quick occupant rescue in case of an occupant being injured. Since the door D is automatically opened, the injured occupant can readily escape out of the vehicle without effort of opening the door D.

Since the apparatus is provided with the separate timer circuits of the timer circuit 11 for measuring the first time T1 and the timer circuit 3 for measuring the second time T2, even if one of the timer circuit 11 and the timer circuit 3 breaks down upon the collision of the vehicle, the other can perform the time measurement, thereby enhancing the actuation reliability. For example, in a case where the timer circuit 11 breaks down because of the collision of the vehicle 0 and outputs a first time passage signal before passage of the first time T1, if the timer circuit 3 is normal, the door D is not automatically opened before the second time T2 is measured by the timer circuit 3.

Each of the above-described embodiments described the case where the opening/closing object of the vehicle was the door D. However, the opening/closing object to be controlled by the opening/closing controlling apparatus of the present invention is not limited to the door, but may be any opening/closing object that separates the compartment from the exterior space and that can be automatically opened and closed, e.g., an autowindow.

INDUSTRIAL APPLICABILITY

The present invention successfully provides the opening/closing controlling apparatus with high actuation reliability in the event of a vehicle accident.

The invention claimed is:

1. An opening/closing controlling apparatus for performing an automatic opening/closing control of an opening/closing object mounted on a vehicle, comprising:
    automatic opening/closing means for automatically opening/closing the opening/closing object;
    collision detecting means for detecting a collision of the vehicle;
    time measuring means for measuring a time from a time when the collision detecting means detects the collision of the vehicle; and
    opening/closing controlling means for prohibiting automatic opening/closing of the opening/closing object from the time of the collision of the vehicle and for permitting the automatic opening/closing by the automatic opening/closing means after a passage of a predetermined first time since the collision and then for making the automatic opening/closing means perform an opening operation of the opening/closing object after passage of a second time since the collision wherein the second time is set longer than the first time.

2. The opening/closing controlling apparatus according to claim 1, wherein the time measuring means comprises first time measuring means for measuring the first time from the time when the collision detecting means detects the collision of the vehicle, and second time measuring means for measuring the second time from the time when the collision detecting means detects the collision of the vehicle, the second time measuring means being provided separately from the first time measuring means, and wherein the opening/closing controlling means prohibits the automatic opening/closing operation of the opening/closing object from the time when the collision detecting means detects the collision of the vehicle, thereafter the opening/closing controlling means permits the automatic opening/closing operation of the opening/closing object after passage of the first time, and then the opening/closing controlling means makes the automatic opening/closing means perform the opening operation of the opening/closing object after passage of the second time set longer than the first time.

3. The opening/closing controlling apparatus according to claim 2, further comprising locking maintaining means for maintaining a locking state of the opening/closing object from the time when the collision detecting means detects the collision of the vehicle, to passage of a third time set shorter than the first time.

4. The opening/closing controlling apparatus according to claim 2, wherein the opening/closing object is a door for entrance and exit mounted on a side of the vehicle.

5. The opening/closing controlling apparatus according to claim 2, wherein the opening/closing object is an autowindow mounted on a side of the vehicle.

6. The opening/closing controlling apparatus according to claim 2, wherein the automatic opening/closing means comprises a motor for opening/closing the opening/closing object and wherein the opening/closing controlling means stops supply of power to the motor, thereby prohibiting the automatic opening/closing of the opening/closing object.

7. The opening/closing controlling apparatus according to claim 1, wherein the time measuring means for measuring the predetermined time comprises at least two time measuring circuits.

8. The opening/closing controlling apparatus according to claim 7, wherein the time measuring means comprises first time measuring means and second time measuring means each for measuring a first time from the time when the collision detecting means detects the collision of the vehicle, and wherein the opening/closing controlling means prohibits the automatic opening/closing operation of the opening/closing object from the time when the collision detecting means detects the collision of the vehicle and thereafter the opening/closing controlling means permits the automatic opening/closing operation of the opening/closing object after passage of the first time is measured by both the first time measuring means and the second time measuring means.

9. The opening/closing controlling apparatus according to claim 8, wherein the opening/closing object is a door for entrance and exit mounted on a side of the vehicle.

10. The opening/closing controlling apparatus according to claim 8, wherein the opening/closing object is an autowindow mounted on a side of the vehicle.

11. The opening/closing controlling apparatus according to claim 8, wherein the automatic opening/closing means comprises a motor for opening/closing the opening/closing object and wherein the opening/closing controlling means stops supply of power to the motor, thereby prohibiting the automatic opening/closing of the opening/closing object.

* * * * *